United States Patent
Djuricic et al.

(10) Patent No.: US 10,618,845 B2
(45) Date of Patent: Apr. 14, 2020

(54) REFRACTORY CERAMIC PRODUCT

(71) Applicant: Refractory Intellectual Property GmbH & Co. KG, Vienna (AT)

(72) Inventors: Boro Djuricic, Leoben (AT); Norbert Freiberger, Graz (AT); Christoph Bauer, Graz (AT); Jurgen Muhlhausser, Leoben (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 0 days.

(21) Appl. No.: 16/080,297

(22) PCT Filed: Mar. 8, 2016

(86) PCT No.: PCT/EP2016/054878
§ 371 (c)(1),
(2) Date: Aug. 27, 2018

(87) PCT Pub. No.: WO2017/152952
PCT Pub. Date: Sep. 14, 2017

(65) Prior Publication Data
US 2019/0077713 A1    Mar. 14, 2019

(51) Int. Cl.
*C04B 35/18* (2006.01)
*C04B 35/101* (2006.01)
(Continued)

(52) U.S. Cl.
CPC .......... *C04B 35/101* (2013.01); *C04B 35/107* (2013.01); *C04B 35/18* (2013.01); *C04B 35/185* (2013.01); *C04B 2235/3201* (2013.01); *C04B 2235/3232* (2013.01); *C04B 2235/3272* (2013.01); *C04B 2235/349* (2013.01); *C04B 2235/3817* (2013.01); *C04B 2235/3843* (2013.01); *C04B 2235/3852* (2013.01); *C04B 2235/3856* (2013.01); *C04B 2235/3891* (2013.01); *C04B 2235/422* (2013.01);
(Continued)

(58) Field of Classification Search
CPC . C23F 15/00; C23C 4/134; C23C 4/02; C23C 4/129; C23C 18/1633; C25D 13/02; C25D 9/04; C25D 17/00
See application file for complete search history.

(56) References Cited

U.S. PATENT DOCUMENTS

| 8,176,831 B2 * | 5/2012 | Kucherov | ............. | F41H 5/0421 |
| | | | | 89/36.02 |
| 2010/0055492 A1 * | 3/2010 | Barsoum | ................ | B22D 19/02 |
| | | | | 428/613 |

(Continued)

FOREIGN PATENT DOCUMENTS

| JP | 2004292176 A | 10/2004 |
| JP | 2014055074 A | 3/2014 |

OTHER PUBLICATIONS

Liu et al. Microstructure and properties of Al2O3—TiC—Ti3SiC2 composites fabricated by spark plasma sintering. Advances in Applied Ceramics 2010 vol. 109, pp. 394-398.*

(Continued)

*Primary Examiner* — Noah S Wiese
(74) *Attorney, Agent, or Firm* — Medley, Behrens & Lewis, LLC

(57) ABSTRACT

The invention relates to a refractory ceramic product.

9 Claims, 4 Drawing Sheets

Figure 1:
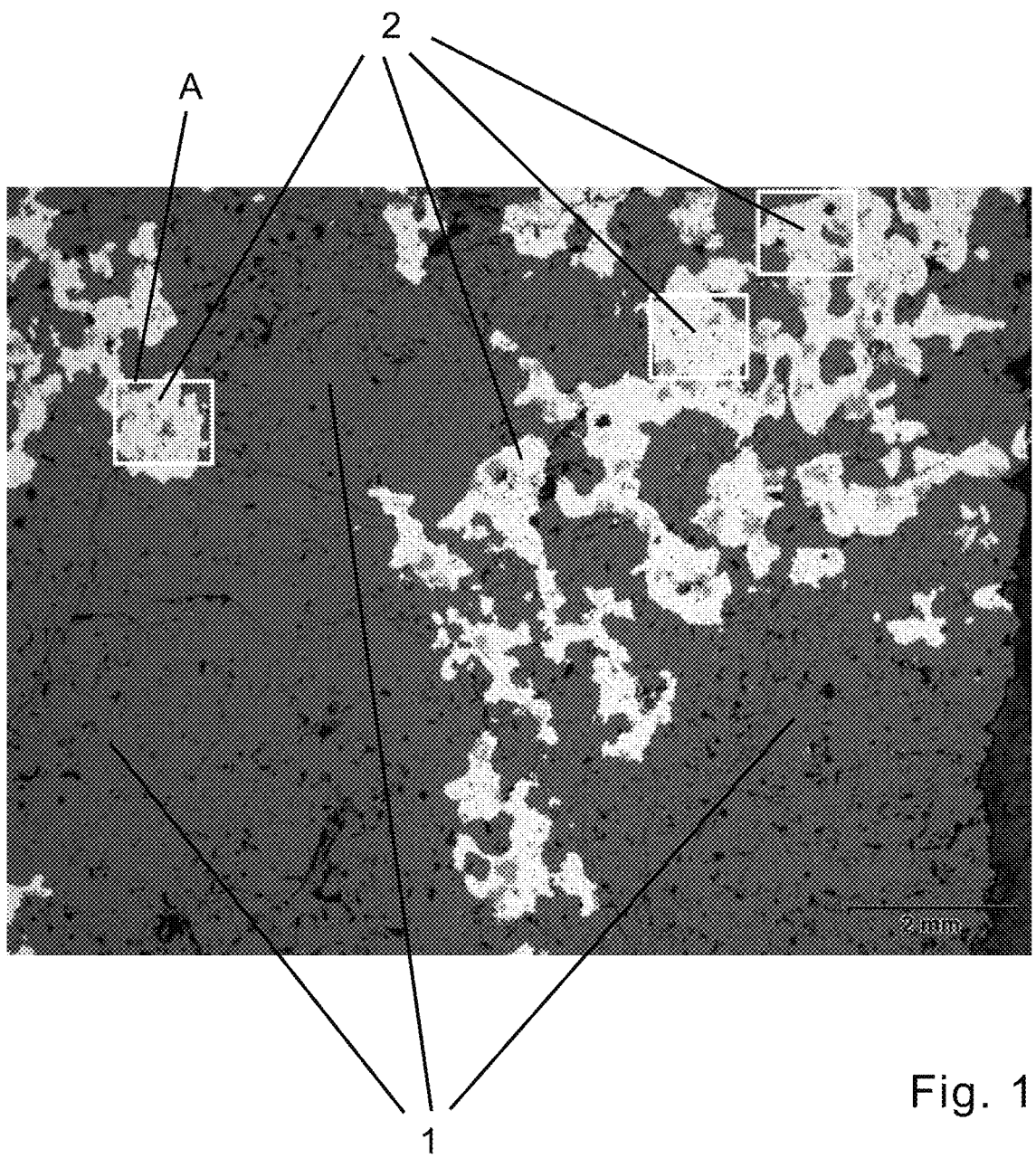

(51) Int. Cl.
  *C04B 35/107* (2006.01)
  *C04B 35/185* (2006.01)
(52) U.S. Cl.
  CPC .... *C04B 2235/425* (2013.01); *C04B 2235/48* (2013.01); *C04B 2235/5436* (2013.01); *C04B 2235/5463* (2013.01); *C04B 2235/65* (2013.01); *C04B 2235/786* (2013.01); *C04B 2235/80* (2013.01); *C04B 2235/9669* (2013.01)

(56) References Cited

U.S. PATENT DOCUMENTS

2010/0322840 A1* 12/2010 Palmqvist ............... C23C 14/06
                                                      423/351
2017/0137949 A1*  5/2017 Bahraini Hasani ....... C23C 4/08

OTHER PUBLICATIONS

"Office Action Issued in Japanese Patent Application No. 2018-555819", dated Aug. 26, 2019, 8 Pages.

* cited by examiner

REFRACTORY CERAMIC PRODUCT

The invention relates to a refractory ceramic product.

The term "refractory ceramic product" as used in the context of the invention in particular describes refractory products with a service temperature of more than 600° C., and preferably refractory materials in accordance with DIN 51060: 2000-6, i.e. materials with a pyrometric cone equivalent of more than SK 17. In particular, the pyrometric cone equivalent may be determined in accordance with DIN EN 993-12: 1997-06.

When used, refractory products are frequently exposed to aggressive liquids and gases at high temperatures, for example slags as well as glass or metal melts. These can infiltrate into the refractory product through cracks and pores, which can result in corrosion of the product. In order to improve the corrosion resistance of refractory ceramic products, the provision of crack-free products with as few pores as possible which are as small as possible is a fervent desire. Such high density and substantially crack-free refractory products, however, often have only a relatively low thermal shock resistance due to the brittleness of refractory ceramic products.

Thus, the prior art describes technologies for reducing the brittleness of a refractory product or to improve its thermal shock resistance and microstructural elasticity.

Thus, for example, it is known to reduce the brittleness of refractory products based on corundum ($Al_2O_3$), magnesia (MgO) and/or magnesia spinel ($MgO.Al_2O_3$) by means of what are known as elasticizers, which are integrated into the matrix of the product and thus improve the thermal shock resistance of the product. The mode of action of these elasticizers is based on the fact that they have a different heat expansion coefficient than the major components of the refractory product, so that during the heat treatment of the product and its subsequent cooling, stresses arise between the elasticizer and the major components. This causes the formation of microcracks in the product which, in the event of a mechanical attack on the product, compensate for a fraction of the fracture energy, whereupon the risk of a brittle fracture of the product can be reduced. However, the disadvantage with using elasticizers of this type is that the corrosion resistance of the product might fall because of the microcracks that are formed.

Improving the microstructure flexibility of magnesia-based or corundum-based refractory products with carbon is also known. The problem with MgO—C bricks or $Al_2O_3$—C bricks, however, is the low thermal stability of the carbon at high temperatures, in particular in oxidizing atmospheres.

The object of the invention is to provide a refractory ceramic product with a high corrosion resistance. In particular, the corrosion resistance of the product provided by the invention should be higher than the corrosion resistance of known refractory ceramic products from the prior art which, in order to improve their thermal shock resistance, microstructural elasticity and fracture toughness, contain an elasticizer as discussed above.

The object of the invention is achieved by means of a refractory ceramic product with the following features:
  the product comprises crystallites in the form of a MAX phase;
  the crystallites in the form of the MAX phase comprise crystallites with a diameter of at least 10 µm.

The invention is based on the surprising fundamental discovery that the corrosion resistance of refractory ceramic products can be improved when these products comprise crystallites in the form of a MAX phase and these crystallites in the form of the MAX phase comprise crystallites with a diameter of at least 10 µm.

In particular, in accordance with the invention, it has been established that the corrosion resistance to metallurgical slags and metal melts of refractory ceramic products which have such crystallites in the form of a MAX phase with a diameter of at least 10 µm can be improved.

In this regard, in accordance with the invention, it has in particular been surprisingly discovered that the corrosion resistance of refractory ceramic products, in particular as regards such metallurgical slags and metal melts, increases sharply when these products have crystallites in the form of a MAX phase with a diameter of at least 10 µm. The inventors are of the opinion that the corrosion resistance of crystallites in the form of MAX phases, in particular as regards slags and metal melts, increases sharply from above a diameter of at least 10 µm, and this corrosion resistance of such crystallites is transferred to the refractory ceramic product which comprises such crystallites.

In known manner, the term "MAX phases" is applied to a class of materials containing sheets of carbides and nitrides which have a layered structure similar to graphite and which have the general formula $M_{n+1}AX_n$, where:
n=1, 2 or 3;
M=an early transition metal, in particular in the form of Sc, Ti, V, Cr, Zr, Nb, Mo, Hf or Ta;
A=a group A element (in particular III A and IV A or from groups 13 and 14), in particular in the form of Al, Si, P, S, Ga, Ge, As, Cd, In, Sn, Ti or Pb; and
X=C and/or N.

This class of MAX phase materials was synthesized, and its properties described, for the first time in the 1990s. MAX phases combine advantageous properties of ceramic and metallic materials, for example a high elasticity, good thermal and electrical conductivity, a high chemical corrosion resistance, a low thermal expansion coefficient as well as a high thermal shock resistance and damage tolerance. The Vickers hardness of polycrystalline MAX phases is in the range 2 to 8 Gpa as a rule; in this respect, MAX phases are softer than most cast ceramics, but harder than most metals [April 2013, American Ceramic Society Bulletin, Vol. 92, No. 3, Miladin Radovic and Michel W. Barsoum]. In addition, most MAX phases are highly oxidation-resistant. Furthermore, at high temperatures, MAX phases undergo a brittle-to-plastic transition (BPT), wherein in particular they also exhibit plastic flexural behaviour. A special distinction of MAX phases is in particular that they are extremely tolerant to damage and resistant to thermal shock and usually can be machined easily. The fracture toughness of MAX phases at room temperature (KO is usually in the range 5 to 20 MPa $\sqrt{m}$, which is thus relatively high compared with the fracture toughness of other ceramics. The origins of the high values for the fracture toughness ($K_{Ic}$) and the R curve behaviour lie in the formation of plastic deformable bridging ligaments and crack-inhibiting properties of buckling boundaries. A further important property of MAX phases is their extraordinary thermal shock resistance. In contrast to typical ceramics, MAX phases do not disintegrate easily under load, but in some cases their residual flexural strength can even increase after being stressed by temperatures of 1,200° C., for example, and subsequent quenching in water at room temperature.

Using MAX phases to influence the properties of composite materials is already known in the prior art. Thus, for example, the use of a MAX phase in the form of $Ti_3SiC_2$ in composite materials based on $Al_2O_3$—TiC—$Ti_3SiC_2$ is known (L. F. Liu et. al: "Microstructure and properties of $Al_2O_3$—TiC—$Ti_3SiC_2$ composites fabricated by spark plasma sintering", Applied Ceramics, 2010, Vol. 109, No. 7, 394-398).

Furthermore, the use of a MAX phase in the form of $Ti_3SiC_2$ in composite materials of the $Al_2O_3$—$Ti_3SiC_2$ type has already been described (Y. M. Luo et al.: "Fabrication of $Al_2O_3$—$Ti_3SiC_2$ and mechanical properties evaluation", Materials Letters, 2003, Vol. 57, 2509-2514; L. Yong Ming et al.: "Preparation and characterization of $Al_2O_3$—$Ti_3SiC_2$ composites and its functionally graded materials", Material Research Bulletin, 2003, Vol. 38, No. 1, 696-78; Y.-L. Chin et al.: "Contribution of plastic deformation of $Ti_3SiC_2$ to the crack deflection in the $Al_2O_3$/$Ti_3SiC_2$ composites", Materials, Science & Engineering A 528, 2011, Vol. 128, No. 7, 3270-3274).

The prior art regularly proposes mixing a raw material in the form of a MAX phase with other raw materials, in particular based on $Al_2O_3$, in order to produce such composite materials, then grinding them together and finally sintering them to form a composite material.

The prior art does in fact mention the grain size of the MAX phase in the form of $Ti_3SiC_2$ prior to grinding it, namely in the range from approximately 1 to 40 µm. However, up to now, no mention has been made of the size of the crystallites of the MAX phase in the composite material following sintering. As discussed above, however, it has surprisingly been observed that it is particularly this very size of the crystallites of the MAX phase in a refractory ceramic product that has an important influence on the corrosion resistance of the refractory product.

In accordance with the invention, the crystallites in the form of the MAX phase which are comprised in the refractory ceramic product in accordance with the invention comprise crystallites with a diameter of at least 10 µm including, for example, with a diameter of at least 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm or 300 µm. The above diameters which crystallites in the form of a MAX phase of the product in accordance with the invention may exhibit at the least are herein also denoted as the "minimum diameter". Particularly preferably, the refractory ceramic product in accordance with the invention comprises crystallites in the form of a MAX phase with a diameter of at least 100 µm and more particularly also with a diameter of at least 200 µm.

In accordance with the invention, it has been established that the corrosion resistance of a refractory ceramic product can be increased with increasing minimum diameter of the crystallites, as set out above.

The term "crystallite" as used here should be understood to mean a coherent, monocrystalline region in a polycrystalline microstructure. Adjacent crystallites are thus separated by grain boundaries and differ in the respective orientation of their crystal structures.

The refractory ceramic product in accordance with the invention comprises crystallites in the form of a MAX phase, wherein this MAX phase may be present in the product in one form or in different forms.

The MAX phase in the product in accordance with the invention may in particular be in the form of at least one of the following forms: $Ti_3SiC_2$ or at least a MAX phase in which:

M=Cr, Zr, Nb, Ti or V,
A=Al, Si or Sn,
X=C or N.

Particularly preferably, however, the crystallites in the refractory ceramic product in accordance with the invention are present in the form of a MAX phase in the form of $Ti_3SiC_2$.

In accordance with the invention, the crystallites in the form of a MAX phase then exhibit the minimum diameter in accordance with the invention when the crystallites have an appropriate minimum diameter at any location. In other words: consider any cross-sectional surface of a crystallite in the form of a MAX phase as well as a straight line which (a) lies in this cross-sectional surface, (b) starts from any point on the marginal line (corresponding to the crystal boundary or grain boundary of the crystallite) of the cross-sectional surface and ends at any other point of the edge line of the same cross-sectional surface, (c) has its entire length lying in the same cross-sectional surface, and (d) has at least one length "n", then the crystallite in the form of the MAX phase in question has a minimum diameter of "n". In accordance with the most general inventive concept, a crystallite in the form of a MAX phase thus, for example, has a diameter of at least 10 µm when the corresponding crystallite has a diameter of at least 10 µm at any point of a cross-sectional surface. In order to establish the diameter or minimum diameter of crystallites of the MAX phases of a refractory ceramic product, a microsection, in particular in the form of a thin microsection or polished section of a refractory ceramic product can be produced and the microsection can then be examined microscopically. Under microscopic examination, the microsections exhibit cross-sectional surfaces for the crystallites of the MAX phases in the sectional plane. In this regard, the refractory ceramic product comprises a crystallite in the form of a MAX phase with a minimum diameter in accordance with the invention, i.e. in accordance with the most general inventive concept, with a diameter of at least 10 µm, as long as the cross-sectional surface contains at least one of the crystallites at any point with the appropriate minimum diameter.

In addition to the MAX phase, the refractory ceramic product in accordance with the invention may comprise at least one refractory base material. This refractory base material may be one or more materials routinely employed for refractory ceramic products. In this respect, the refractory ceramic product in accordance with the invention may be based on at least one of such refractory base materials.

As an example, the refractory base material may be at least one oxide refractory base material. Alternatively, the refractory base material may, for example, be at least one non-oxide refractory base material. Furthermore, the refractory base material may be a mixture of at least one oxide and at least one non-oxide refractory base material.

An example of a non-oxide refractory base material could be one or more of the following non-oxide refractory base materials: a nitride, a carbide, an oxycarbide or a carbonitride. An example of a non-oxide refractory base material in the form of a carbide could be one or more of the following carbides: silicon carbide (SiC), boron carbide ($B_4C$), titanium carbide or tungsten carbide (WC). The titanium carbide may in particular be in the form of at least one of the two titanium carbides, TiC or $Ti_3C_2$, but also, for example, in the form of a further titanium carbide from the titanium carbide family. An example of a non-oxide refractory base material in the form of a nitride could be one or more of the following nitrides: aluminium nitride (AlN), boron nitride (BN), gallium nitride (GaN), indium nitride (InN), silicon nitride ($SiN_4$) or titanium nitride (TiN). An example of a non-oxide refractory base material in the form of an oxycarbide could be aluminium oxycarbide ($Al_4O_4C$). An example of a non-oxide refractory base material in the form of a carbonitride could be aluminium oxycarbonitride ($Al_{28}C_6N_6O_{21}$). Preferably, the refractory ceramic product in accordance with the invention comprises a non-oxide refractory base material in the form of at least one of the carbides titanium carbide or silicon carbide.

In accordance with the invention, the crystallites in the form of a MAX phase may contain at least one, but in particular also each a plurality of inclusions in the form of titanium carbide. In this regard, the titanium carbide may in particular be in the form of at least one of the two titanium carbides TiC or $Ti_3C_2$, as discussed above, but also, for example in the form of a further titanium carbide from the titanium carbide family. In accordance with the invention, it has surprisingly been shown that the corrosion resistance of the refractory ceramic material can be improved in this manner. It has also been shown that the bending strength of the refractory ceramic material can be improved in this manner.

Preferably, the refractory base material is an oxide refractory base material. An example of an oxide refractory base materials could be one or more of the following oxides: aluminium oxide ($Al_2O_3$), silicon oxide ($SiO_2$), magnesium oxide (MgO), calcium oxide (CaO), chromium oxide ($Cr_2O_3$) or zirconium oxide ($ZrO_2$). In a particularly preferred embodiment, the refractory ceramic product in accordance with the invention comprises oxide refractory base material in the form of $Al_2O_3$.

The refractory ceramic product in accordance with the invention may, for example, comprise refractory base material in a proportion of at least 50% by weight including, for example, in a proportion of at least 55, 60, 65, 70, 75, 80, 85, 90, 91, 92, 93, 94, 95, 96, 97, 98 or 99% by weight.

When the refractory ceramic product in accordance with the invention contains a refractory base material in the form of $Al_2O_3$, the refractory ceramic product in accordance with the invention may contain a proportion of $Al_2O_3$ of at least 50% by weight including, for example, a proportion of at least 55, 60, 65, 70, 75, 80, 85, 90, 91, 92, 93, 94, 95, 96, 97, 98 or 99% by weight.

When the refractory ceramic product in accordance with the invention contains a refractory base material in the form of at least one of the carbides titanium carbide or silicon carbide, the refractory ceramic product in accordance with the invention may contain a proportion of at least one of the carbides titanium carbide or silicon carbide in the range 0.1% by weight to 5% by weight including, for example, a proportion of at least 0.1 or 0.5 or 1.5 or 1.8 and also, for example, in a proportion of at most 5.0 or 4.5 or 4.0 or 3.5 or 3.0 or 2.5 or 2.2% by weight.

The refractory ceramic product in accordance with the invention may, for example, contain refractory base material in a proportion of at most 99.5% by weight including, for example, in a proportion of at most 99, 98, 96, 95, 92, 90, 88, 85, 80, 75 or 60% by weight.

When the refractory ceramic product in accordance with the invention contains a refractory base material in the form of $Al_2O_3$, the refractory ceramic product in accordance with the invention may contain a proportion of $Al_2O_3$ of at most 99.5% by weight including, for example, a proportion of at most 99, 98, 96, 95, 92, 90, 88, 85, 80, 75 or 60% by weight. In one embodiment, the proportion of $Al_2O_3$ in the product is in the range 90 to 99.5% by weight.

The refractory ceramic product in accordance with the invention may contain MAX phases, for example in a proportion of at least 0.5% by weight including, for example, in a proportion of at least 0.6 or 0.8 or 1.0 or 1.2 or 1.4 or 1.6 or 1.8 or 2.0 or at least 2.5% by weight. Furthermore, the refractory ceramic product in accordance with the invention may comprise MAX phases in a proportion of at most 50% by weight including, for example, in a proportion of at most 35, 30, 25, 20, 15, 13, 12, 11, 10, 9, 8, 7, 6, 5 or 4% by weight. In one embodiment, the proportion of MAX phases in the product is in the range 0.5 to 10% by weight.

It is possible for the refractory ceramic product in accordance with the invention, in addition to the oxide and non-oxide refractory base materials defined above and the MAX phases, to include further components in a proportion of less than 10% by weight including, for example, in a proportion of less than 9, 8, 7, 6, 5, 4, 3, 2 or 1% by weight.

When the refractory ceramic product in accordance with the invention contains a refractory base material in the form of $Al_2O_3$, it is possible for the refractory ceramic product in accordance with the invention, in addition to $Al_2O_3$ and MAX phases, to contain further components in a proportion of less than 10% by weight including, for example, a proportion of less than 9, 8, 7, 6, 5, 4, 3, 2 or 1% by weight.

The product in accordance with the invention may in particular contain at least one of the following phases: metallic aluminium, metallic silicon, metallic titanium, metallic iron or at least one alloy formed from the metals aluminium, silicon, titanium or iron. The presence of metallic aluminium, silicon, titanium or iron as well as alloys thereof in the product can improve the corrosion resistance of the product still further, in particular when cracks or fractured surfaces are produced in or on the product during use of the product. Such cracks or fractured surfaces in or on the product may, for example, be caused by a mechanical attack on the product, by thermomechanical stresses in the product, by a highly corrosive attack on the product or by raised temperatures. Along these cracks or fractured surfaces which have been formed, metallic aluminium, silicon, titanium or iron or alloys which until now have been protected from the surrounding atmosphere in the interior of the product, are then freed, whereupon they are now exposed to the surrounding atmosphere. In the case of an oxidizing atmosphere, the metallic aluminium, silicon, titanium or iron or alloys thereof are oxidized, which is accompanied by an increase in volume. In this manner, the cracks and fractured surfaces which occur can be closed, whereupon the ingress of corrosive media such as slags or melts into the product can be prevented. Because of this self-healing effect, the corrosion resistance of the product can be further improved. Preferably, the product comprises proportions of metallic aluminium, silicon, titanium or iron or alloys thereof in a total weight in the range 0.1% by weight to 1.0% by weight including, for example, in a total weight of at least 0.1% by weight, 0.2% by weight, 0.3% by weight, 0.4% by weight or 0.5% by weight and also, for example, in a total weight of at most 1.0% by weight, 0.9% by weight, 0.8% by weight, 0.7 or 0.6% by weight. The presence of metallic aluminium in the pure form or in the form of an alloy with at least one of the further metals silicon, titanium or iron has proved to be particularly effective in improving the corrosion resistance. In this regard, the product may comprise proportions of metallic aluminium in the range 0.1% by weight to 1.0% by weight including, for example, in a weight of at least 0.1% by weight, 0.2% by weight, 0.3% by weight, 0.4% by weight or 0.5% by weight and also, for example, in a weight of at most 1.0% by weight, 0.9% by weight, 0.8% by weight, 0.7 or 0.6% by weight.

The percentages given here, as a % by weight, are respectively with respect to the total weight of the refractory ceramic product in accordance with the invention unless stated otherwise.

In accordance with a particularly preferred embodiment, the crystallites in the form of a MAX phase have a mean diameter of at least 10 µm. In this regard, the refractory ceramic product in accordance with the invention not only comprises individual crystallites in the form of a MAX phase with a minimum diameter as discussed above, but rather, the crystallites in the form of a MAX phase as a whole have a mean diameter of at least 10 µm. In this manner, a particularly good corrosion resistance is guaranteed for the refractory ceramic product in accordance with the invention. In this respect, the crystallites in the form of a MAX phase have a mean diameter of at least 10 µm including, for example, a mean diameter of at least 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm or 300 µm. The mean diameter described above which the crystallites in the form of a MAX phase of the product in accordance with the invention may have, will herein also be described as the "mean minimum diameter". Particularly preferably, the refractory ceramic product in accordance with the invention contains crystallites in the form of a MAX phase with a mean diameter of at least 100 µm and more particularly also with a mean diameter of at least 200 µm.

The crystallites in the form of the MAX phase may reach the mean minimum diameter with respect to the total weight of the crystallites. However, in accordance with the invention, it has been shown that it is sufficient for the purposes of improving the corrosion resistance of the refractory ceramic product in accordance with the invention for the crystallites to have the mean minimum diameter only in respect of the major proportion by weight of the crystallites, with respect to the total weight of the crystallites in the form of a MAX phase in the product. In this regard, in accordance with one embodiment, the crystallites in the form of a MAX phase have the mean minimum diameter in accordance with the invention in respect of at least 50% by weight of the crystallites in the form of a MAX phase including, for example, with respect to at least 60, 70, 80, 90 or 95% by weight of the crystallites in the form of a MAX phase, respectively with respect to the total weight of the crystallites in the form of a MAX phase in the product in accordance with the invention. Particularly preferably, the crystallites in the form of a MAX phase exhibit the mean minimum diameter in accordance with the invention in respect of at least 90% by weight of the crystallites in the form of a MAX phase, with respect to the total weight of the crystallites in the form of a MAX phase in the product in accordance with the invention.

In accordance with the invention, it has been established that the corrosion resistance of a refractory ceramic product can be increased with increasing mean minimum diameter of the crystallites, as discussed above.

The mean minimum diameter of the crystallites in the form of a MAX phase is determined using the "Intercept Procedure" of ASTM E 112—96 (Reapproved)$^{e2}$. In order to carry out this intercept procedure of ASTM E 112—96 (Reapproved)$^{e2}$, as discussed above, microsections may be produced from a refractory ceramic product and the mean diameter of the crystallites of the MAX phase can be determined using the diameter of the cross-sectional surfaces of the crystallites measured by the intercept procedure.

The microstructure of a refractory ceramic product in accordance with the invention is preferably depicted as a matrix formed from at least one refractory base material in which the crystallites in the form of a MAX phase are embedded. The MAX phases can in this regard be in the form of individual, in particular mutually isolated regions formed by one or more crystallites. In this respect, these regions may be constituted as a polycrystalline microstructure formed by a plurality of crystallites in the form of MAX phases. Furthermore, these regions formed by MAX phases are embedded in a matrix formed from a refractory base material that may be constituted as above. If the refractory base material is entirely or essentially in the form of $Al_2O_3$, the MAX phases may, for example, be embedded in this respect in a matrix which is entirely or essentially in the form of $Al_2O_3$.

The refractory ceramic product may be in the form of a sintered refractory ceramic product. To produce a sintered refractory ceramic product of this type, the raw materials for producing a product of this type may be sintered together to form a refractory ceramic product of this type. In order to produce a sintered refractory ceramic product of this type, the process for producing a sintered refractory ceramic product which is known in the prior art may be employed. In this regard, the raw materials for the process which is known in the prior art may be prepared, i.e., with a specific grain size, for example. Next, the individual raw materials may, for example, be mixed together and, for example, also be comminuted together. Next, the raw materials may, for example, be shaped to form a shaped article, for example by pressing. In order to provide the unfired shaped article, known as the green body, with the necessary stability, prior to pressing, the raw materials may, for example, be mixed with a binder, for example an organic binder. The shaped article may then be sintered, if necessary following drying, for example by using spark plasma sintering (SPS) as described, for example in the publication by L. F. Liu et al. cited above.

When the refractory product in accordance with the invention in the form of a sintered product is provided, then in particular, the raw materials for producing a product of this type may, inter alia, also comprise a raw material in the form of a MAX phase which in particular can be provided as granular material. Because the size of the crystallites of the MAX phases of this raw material does not or is not essentially changed during sintering, then in accordance with the invention, the raw material in the form of the MAX phase which is provided for the production of a sintered refractory ceramic product may in particular already contain crystallites with a minimum diameter in accordance with the invention or may already contain crystallites with a mean minimum diameter. In addition to a raw material in the form of a MAX phase, in order to produce a sintered refractory ceramic product in accordance with the invention, one or more further raw materials may be provided based on one or more of the refractory base materials mentioned above. When the product in accordance with the invention comprises a refractory base material in the form of $Al_2O_3$, then one or more of the following raw materials based on $Al_2O_3$ may be provided: fused corundum, sintered corundum, tabular alumina, bauxite or calcined alumina. Particularly preferably, a raw material is provided in the form of calcined alumina.

In accordance with a particularly preferred embodiment, as an alternative, the refractory ceramic product in accordance with the invention is in the form of a solidified melt. Thus, the product in accordance with the invention is formed by a melt which has solidified following cooling. Here again in this embodiment, the crystallites in the form of a MAX phase, as discussed above, may be embedded into the matrix formed by at least one refractory base material.

In order to produce a refractory ceramic product in accordance with the invention in the form of a solidified melt of this type, initially, raw materials can be melted together and the melt formed is then cooled until it solidifies, and subsequently forms a refractory ceramic product in accordance with the invention in the form of a solidified melt.

In this regard, in order to produce a product of this type in the form of a solidified melt, the raw materials employed may be raw materials of the type which comprise elements from which a MAX phase can be constructed. When, for example, at least one MAX phase is to be used in the form of $Ti_3SiC_2$ in the product, raw materials may be used which comprise titanium, silicon and carbon. As an example of titanium-comprising raw materials, one or more of the following raw materials may be used: rutile, rutile sand or aluminium titanate; preferably, rutile sand is used as the raw material. As an example of silicon-comprising raw materials, one or more of the following raw materials may be used: kaolin, fire clay, refractory clay, mullite, quartzite, quartz sand or zirconia; preferably, kaolin is used as the raw material. As an example of carbon-comprising raw materials, one or more of the following raw materials may be used: graphite, anthracite, soot, petroleum coke, silicon resin or phenol resin; preferably, graphite is used as the raw material. Furthermore, the raw materials may comprise elements for forming the refractory base material including, for example, elements for forming the aforementioned oxide and/or non-oxide refractory base materials. When a refractory base material is provided in the form of $Al_2O_3$ in the product, then one or more of the following raw materials based on $Al_2O_3$ may be provided, for example: fused corundum, sintered corundum, tabular alumina, bauxite or calcined alumina; preferably, calcined alumina is used as the raw material. In this respect, examples of raw materials for the production of a product of this type in the form of a solidified melt with a refractory base material in the form of $Al_2O_3$ may be a raw material in the form of calcined alumina as the component comprising $Al_2O_3$, a raw material in the form of graphite as the carbon-comprising component, a raw material in the form of kaolin as the silicon-comprising component, as well as a raw material in the form of rutile sand as the titanium-comprising component. A mixture of these raw materials may then be melted, for example in an electric arc furnace, and the melt can then be cooled until it forms a solidified melt. The solidified melt then comprises crystallites in the form of a MAX phase in the form of $Ti_3SiC_2$ as well as a refractory base material in the form of $Al_2O_3$ surrounding this MAX phase in which the MAX phase is embedded.

In accordance with the invention, it has been established that the conditions during solidification of the melt exert a decisive influence on the formation of the size of the crystallites of the MAX phase right up until solidification is complete. In this regard, it has been established in accordance with the invention that seed crystals formed by a MAX phase present in the melt can in particular grow to crystallites in the form of a MAX phase with a diameter of at least 10 µm when the seed crystals are in a liquid environment for a sufficient interval of time or are surrounded by the melt for a sufficient interval of time, because the diffusion processes required for crystal growth can only take place at a sufficient rate in this case. As soon as the material surrounding the seed crystals has solidified, crystal growth drops rapidly. In accordance with the invention, it has been established that, in particular, the melt must be cooled in a manner such that crystallites in the form of a MAX phase with a diameter of at least 10 µm are obtained in the solidified melt, so that in the regions in which seed crystals form from a MAX phase, the melt must be maintained in the molten state for a time period of at least 30 minutes for the conditions suitable for crystal growth to be produced around the seed crystals. In particular, this time period for improving crystal growth may be at least 35, 40, 50, 60, 90 or 120 minutes.

The invention also relates to a batch which comprises one or more of the raw materials mentioned above for the production of the refractory ceramic product in accordance with the invention.

When the batch is used to produce a sintered refractory ceramic product, the batch comprises one or more raw materials based on at least one of the refractory base materials described above, as well as one or more raw materials based on a MAX phase with crystallites in the form of the MAX phase with a minimum diameter in accordance with the invention or with a mean minimum diameter in accordance with the invention.

When the batch is used for the production of a refractory ceramic product in the form of a solidified melt, the batch comprises one or more raw materials which comprise elements from which at least one of the refractory base materials as well as a MAX phase as described above can be formed.

The invention also relates to a process for the production of the refractory ceramic product in accordance with the invention in the form of a solidified melt, which comprises the following steps:
 providing a batch in accordance with the invention for the production of a refractory ceramic product in the form of a solidified melt;
 melting the batch;
 cooling the melt in a manner such that the melt forms a refractory ceramic product in accordance with the invention.

In particular, the melt can be cooled as described above. In particular, in regions in which seed crystals are formed from a MAX phase, the melt may be held in the molten state for a period of time such that the seed crystals grow to a diameter of at least 10 µm.

The refractory ceramic product in accordance with the invention may, for example, be formed as a ceramic shaped article or, for example, as a component of a ceramic shaped article.

Alternatively, the refractory ceramic product in accordance with the invention may, for example, also be provided in the form of a raw material for the production of a product in the form of a refractory ceramic product. In this regard, the refractory ceramic product in accordance with the invention may be in the form of a raw material or in the form of a raw material component of a finished product of this type.

The invention also pertains to a finished product which comprises the refractory ceramic product in accordance with the invention.

Further features of the invention will become apparent from the claims, the exemplary embodiment, the figures as well as the corresponding description of the figures.

Any of the features of the invention may be combined in any manner either individually or in combination.

An exemplary embodiment of the invention will now be described in more detail.

According to the exemplary embodiment, a refractory ceramic product in accordance with the invention was produced in the form of a solidified melt.

In order to produce a product of this type, firstly, a batch was produced which comprised an aluminium-comprising component in the form of calcined alumina, a carbon-comprising component in the form of natural graphite, a silicon-comprising component in the form of kaolin and a titanium-comprising component in the form of natural rutile sand. The batch had a total weight of approximately 400 kg.

The calcined alumina had a proportion of $Al_2O_3$ of more than 99% by weight and a proportion of $Na_2O$ of less than 0.4% by weight, respectively with respect to the total weight of the calcined alumina. The calcined alumina had a d90 grain size of less than 100 µm. The proportion of calcined alumina with respect to the total batch weight was 72% by weight.

The natural graphite had a proportion of carbon of more than 94.5% by weight and a proportion of clay minerals of less than 5% by weight, respectively with respect to the total weight of the graphite. The graphite had a d90 grain size of less than 500 µm. The proportion of graphite in the total batch weight was 8% by weight.

The kaolin had a proportion of kaolinite and other clay minerals of more than 97% by weight and a proportion of $Fe_2O_3$, $Na_2O$ and $K_2O$ of less than 1.6% by weight, respectively with respect to the total weight of kaolin. The d90 grain size of the kaolin was less than 20 µm. The proportion of the kaolin with respect to the total batch weight was 15% by weight.

The $TiO_2$ substrate used had a proportion of $TiO_2$ of more than 98% by weight with respect to the total weight of the $TiO_2$ substrate. The d90 grain size of the $TiO_2$ substrate was less than 150 µm. The proportion of $TiO_2$ substrate with respect to the total weight of the batch was 5% by weight.

The proportions of aluminium, carbon, silicon and titanium in the batch were in the following ranges:
aluminium, calculated as $Al_2O_3$: 78% by weight;
carbon: 7.6% by weight;
silicon, calculated as $SiO_2$: 8.61% by weight;
titanium, calculated as $TiO_2$: 5% by weight;
$Fe_2O_3$: 0.17% by weight;
$Na_2O+K_2O$: 0.43% by weight;
remainder: 0.19% by weight.

The batch was mixed.

The batch prepared in this manner was then heated for approximately 6 hours in a reducing atmosphere by the electric arc in the electric arc furnace, whereupon the batch was heated to temperatures of more than approximately 2000° C. and a melt was formed from the batch.

The melt was then slowly cooled, whereupon MAX phases were formed with crystallites with a diameter of more than 10 µm.

Specifically, the melt in any regions in which seed crystals of a MAX phase were formed was held in the molten state for a time period of approximately 40 minutes so that the seed crystals were subjected to conditions suitable for crystal growth. Because of these solidification conditions, the MAX phases formed crystallites which also had a diameter in the range from approximately 10 to 300 µm.

The microstructure of the solidified melt comprised corundum ($Al_2O_3$) as the major phase, which formed a matrix in which MAX phases were embedded in the form of $Ti_3SiC_2$. The proportion of corundum in the solidified melt was approximately 93% by weight and the proportion of MAX phases was approximately 2% by weight, each with respect to the total weight of the product. In addition to the phases described above in the form of corundum and MAX phase, the product contained further phases, in particular in the form of titanium carbide, silicon carbide, nitride and carbide phases, as well as in the form of metallic aluminium, silicon, titanium and iron. Many of the crystallites in the form of MAX phases had inclusions of titanium carbide in the form of TiC and $Ti_3C_2$.

In order to determine the diameter of the crystallites of the MAX phases of the product, microsections of the product which had been formed were produced and micrographs of the microsections were prepared under reflected crossed polarized light. Under the crossed polarizers, the grain boundaries or crystal boundaries of the individual crystallites of the MAX phases were readily discernible since the individual crystallites, because of the different orientations of their crystal structure, were depicted in different colours or interference colours.

Using the micrographs, it was established that the majority of the crystallites of the MAX phase had a diameter of more than 10 µm. In this regard, as discussed above, using the microsections of the crystallites visible in the micrographs, an examination was carried out as to whether the product comprised crystallites the cross-sectional surface of which had a diameter of at least 10 µm at some point. This was indeed the case with the majority of the crystallites of the MAX phase produced in accordance with the exemplary embodiment. In particular, the product also comprised crystallites in the form of a MAX phase with a diameter of at least 400 or even at least 500 µm, as described below in the description of the figures.

In order to determine the mean diameter of the crystallites of the MAX phase, the Intercept Procedure of ASTM E 112—96 (Reapproved)$_{e2}$ was used (using a factor of 1.5 for spherical crystals in accordance with A2.3.1). This method was also carried out using the micrographs which had been obtained as a basis. In that case, the crystallites of the MAX phase had a mean diameter of approximately 352 µm, in fact for more than 90% by weight of the crystallites in the form of the MAX phase. As can be seen in FIGS. 1 to 4, there was only a very small proportion by weight of very small crystallites in the form of the MAX phase which, when determining the mean diameter of the crystallites using the Intercept Procedure of ASTM E 112—96 (Reapproved)$^{e2}$, were not considered.

Figure 2:
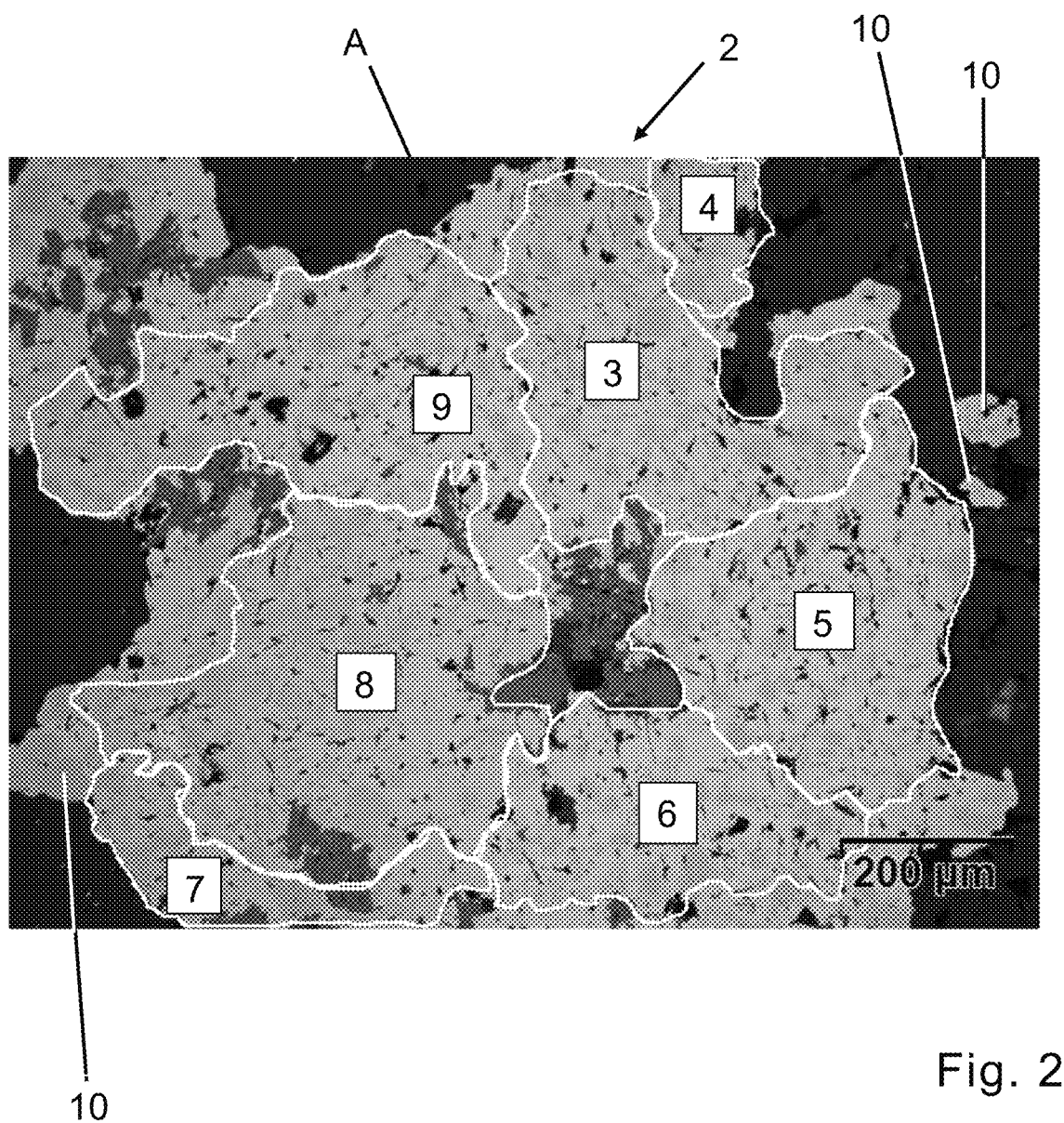
Figure 3:
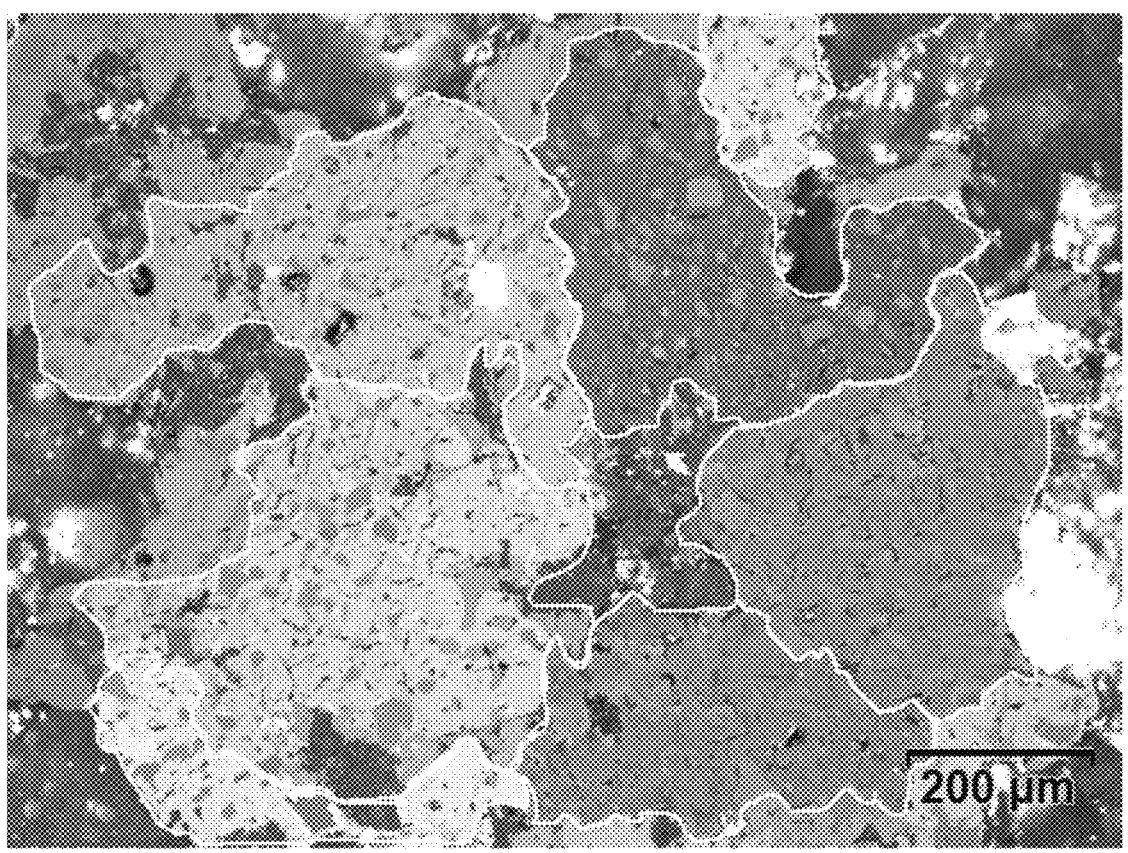
Figure 4:
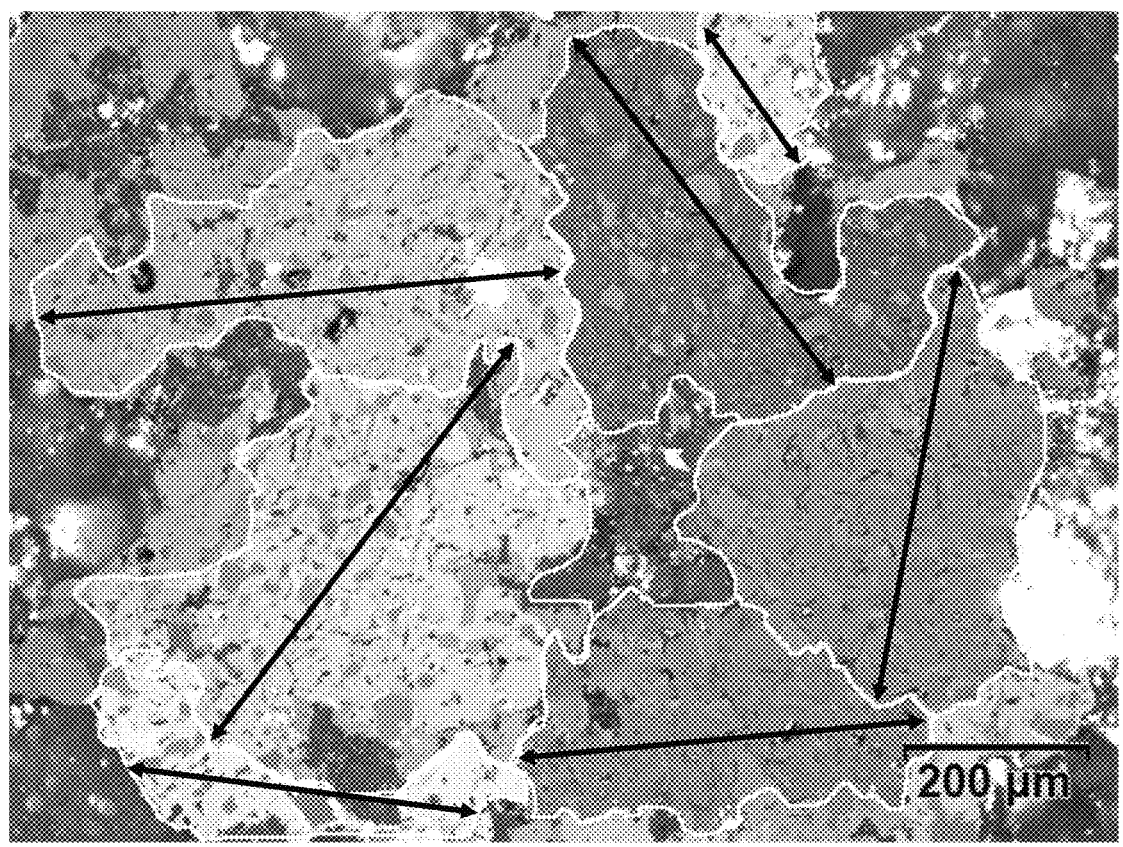

In the accompanying figures:

FIG. 1 shows a micrograph under reflected light of a microsection of the refractory ceramic product produced in accordance with the exemplary embodiment, FIG. 2 shows section A of FIG. 1 under reflected light, FIG. 3 shows section A of FIG. 1 under reflected light under crossed polarizers, and FIG. 4 shows section A of FIG. 1 under reflected light under crossed polarizers and with the diameters of the crystallites in the form of MAX phases marked.

FIG. 1 shows a section of an image under reflected light of a microsection of a polished section of the refractory ceramic product which had been produced in accordance with the exemplary embodiment. The black bar at the bottom right hand side in FIG. 1 corresponds to a length of 2 mm, and so the entire section had a surface area of approximately 12.3×9.2 mm. In FIG. 1, a dark grey matrix 1 formed from corundum can be seen in which the other MAX phases, which are lighter in FIG. 1, and provided with the reference numeral 2, are embedded in the manner of islands.

An enlarged section A of FIG. 1 in which a region of this type in the form of a MAX phase 2 is present is shown in FIG. 2. The black bar at the bottom right hand side in FIG. 1 corresponds to a length of 200 μm, and so the entire section has a surface area of 1.2×0.9 mm.

The MAX phase 2 of FIG. 2 exhibits many crystallites 3, 4, 5, 6, 7, 8, 9 in the form of MAX phases the crystallite boundaries or grain boundaries of which are shown as white lines in FIG. 2. Similarly sized crystallites 3, 4, 5, 6, 7, 8, 9 were also examined using the Intercept Procedure determination of the mean diameter of the crystallites of ASTM E 112—96 (Reapproved)$^{e2}$. Smaller crystallites, for example those denoted in FIG. 2 with the reference numeral 10, and which—with respect to the total weight of the crystallites in the form of the MAX phase—were clearly below 10% by weight, were not considered.

FIG. 3 shows the section of FIG. 2 under crossed polarizers, wherein the individual crystallites 3, 4, 5, 6, 7, 8, 9 appear in different shades of grey.

FIG. 4 shows the section of FIG. 2, wherein in the crystallites 3, 4, 5, 6, 7, 8, 9, a diameter shown by the double-headed arrow was measured at any cross-sectional surface of the crystallites 3, 4, 5, 6, 7, 8, 9. The diameters had sizes in the range from approximately 440 to 560 μm, and thus had a respective diameter of at least 10 μm.

The refractory ceramic product produced in accordance with the exemplary embodiment has an excellent corrosion resistance, in particular as regards metallic slags and metal melts.

The refractory ceramic product produced in accordance with the exemplary embodiment is therefore eminently suitable for use as a raw material for the production of finished refractory ceramic products in order to improve the corrosion resistance of a product produced from this product.

The invention claimed is:

1. A refractory ceramic product having the following features:
   1.1 the product comprises crystallites in the form of a MAX phase;
   1.2 the crystallites in the form of the MAX phase comprise crystallites with a diameter of at least 10 μm.

2. The product as claimed in claim 1, comprising at least one refractory base material.

3. The product as claimed in at least one of the preceding claims, based on a refractory base material in the form of aluminum oxide.

4. The product as claimed in at least one of the preceding claims, with a MAX phase in the form of Ti3SiC2.

5. The product as claimed in at least one of the preceding claims, in which the crystallites in the form of a MAX phase are embedded in a matrix formed by at least one refractory base material.

6. The product as claimed in at least one of the preceding claims, in the form of a solidified melt.

7. The product as claimed in at least one of the preceding claims, in which the crystallites in the form of a MAX phase comprise crystallites with a diameter of at least 100 μm.

8. The product as claimed in at least one of the preceding claims, in which at least 90% by weight of the crystallites in the form of a MAX phase have a mean diameter of at least 10 μm.

9. A finished product which comprises a product as claimed in at least one of the preceding claims.

* * * * *